United States Patent Office 2,858,333
Patented Oct. 28, 1958

2,858,333

SULFONATED OIL SHALE

Frank M. Brower, Midland, Mich., assignor to The Dow Chemical Company, Midland, Mich., a corporation of Delaware No Drawing. Application July 20, 1956
Serial No. 599,012

20 Claims. (Cl. 260—504)

This invention relates to sulfonated oil shale and to a method for its preparation.

According to the present invention, a utile sulfonated oil shale product may be provided by treating an oil shale with a sulfonating reagent that is selected from the group consisting of oleum (which is also known as being fuming sulfuric acid), chlorosulfonic acid, free sulphur trioxide and mixtures thereof. Advantageously, the sulfonation treatment may be accomplished when the oil shale, in a finely divided form, is suspended in an inert liquid medium. More advantageously, the sulfonation is effected after substantially all of the naturally occurring carbonate substances that are extractable upon ordinary acidification have been removed from the oil shale. After sulfonation, it is usually propitious to extract the alkali-soluble constituents from the sulfonated material so as to leave a substantially alkali-insoluble product.

Ordinarily, in order to obtain pronounced benefit, it is desirable to sulfonate an oil shale that has a Fisher assay of at least about 10 gallons of oil per ton. Frequently, it may be preferable to employ chlorosulfonic acid as the sulfonating reagent although oleum and free sulfur trioxide may also be utilized suitably. When free sulfur trioxide is used as the sulfonating reagent, it may be beneficial to dissolve the reagent in a suitable solvent, such as a chlorinated hydrocarbon solvent, for this purpose. In some instances free sulfur trioxide vapors may be employed for the sulfonation with or without inert gaseous diluents. The sulfonation, or at least its initial portion, is usually best conducted at about a room temperature or at a temperature in the range from about 20 to 40° C. Sulfonation at higher temperatures may cause degradation and discoloration of the product to occur. Since oil shale has an indeterminate chemical composition, the precise quantities of the sulfonating reagent that are required may vary with the particular oil shale that is being sulfonated. Usually an excess quantity of the sulfonating reagent is employed, based on the amount of sulfonation actually effected in the oil shale. A suitable degree of sulfonation may usually be obtained within about 24 hours and frequently within much shorter periods of time. Excessive sulfonation tends to produce greater proportions of alkali-soluble constituents in the sulfonated product.

Any liquid that is inert, or substantially inert, to the sulfonating reagent may be utilized for suspending the oil shale during treatment. As an example, methylene chloride may frequently be found suitable for such purposes, especially when chlorosulfonic acid is used as the sulfonating reagent. Oil shale having an average particle size between about 100 and 200 mesh in the U. S. Sieve Series may be employed with particular advantage in the practice of the invention. Such a fine particle size may be obtained readily by crushing and milling the oil shale in a conventional manner.

It is especially beneficial, as indicated, to remove substantially all of the naturally occurring, acid extractable carbonate substances from the oil shale prior to its sulfonation. Removal of the carbonates, which frequently constitute a predominant proportion of the inorganic matter present in the oil shale, may reduce the weight of the naturally occurring material by as much as 25 percent. The removal may generally be accomplished conveniently by pretreating the oil shale with a suitable acid. Beneficially, an aqueous acid such as hydrochloric that decomposes the carbonates and produces soluble calcium and magnesium salts may be employed since the carbonates often occur in the oil shale in the form of salts of these metals. In certain instances, however, other acids, including sulfuric, may be employed for decomposition of the carbonates if the pretreated material is sufficiently washed with water to leach or flush out the relatively insoluble salt residues that may thereby form. Acid pretreatment of the oil shale, especially when it is performed with hydrochloric acid, provides the additional benefit of rendering the kerogen in the oil shale more available for the subsequent sulfonation.

The sulfonated oil shale of the present invention may beneficially contain at least about 1 percent by weight of combined sulfur in addition to the naturally occurring combined sulfur in the material. Preferably, due to acid pretreatment, the sulfonated oil shale of the present invention is substantially devoid of inorganic carbon that is further extractable upon ordinary acidification. In addition, as a result of the extraction of alkali-soluble constituents after the sulfonation has been accomplished, it is likewise preferable for the sulfonated oil shale compositions of the invention to be comprised of substantially alkali-insoluble material. In this connection, it is common for many forms of sulfonated oil shale in accordance with the invention that are most desirable for many purposes to have a weight that has been reduced by at least half from the original weight of the naturally occurring oil shale due to the material loss incurred in the preliminary acid pretreatment and final extraction of alkali-soluble constituents from the sulfonated material. As is apparent, the sulfonated material may be obtained in a free acid form or in the form of one of its salts by conversion of the free acid, whichever may be desired. Advantageously, the total combined sulfur content of a sulfonated oil shale that is substantially devoid of inorganic carbon and is comprised of substantially alkali-insoluble material may be between about 2 and 8 percent by weight.

The sulfonated oil shale of the present invention, particularly the free acid form and its alkali metal salts, may be employed as an ion-exchanging material since it has the ability to enter into exchange reactions with various ions in solution. Its capacity as an ion-exchange material is ordinarily roughly commensurate with that which is found in the usual sulfonated coal ion-exchange preparation. However, the sulfonated oil shale product of the present invention has greater stability and causes less discoloration in alkaline media than do the usual sulfonated coal preparations. This is a surprising phenomenon, particularly when consideration is accorded the fact that, unlike most coals, the organic materials which are present in the kerogen of the usual oil shale are largely, if not essentially completely, aliphatic rather than aromatic in their nature. In substantiation of this, the ultimate analysis of the kerogen in a typical Colorado oil shale, which is indicative but not necessarily representative of oil shales in general, may be about 79.2 percent by weight of carbon; 10.55 percent by weight of hydrogen; 2.6 percent by weight of nitrogen; 1.2 percent by weight of sulfur and the balance oxygen with a carbon to hydrogen weight ratio of about 7.50, as reported by G. W. Himus in Petroleum, 4, 9 (1941). Further evidence of the essentially aliphatic nature of most kerogen in oil shale derives from the fact that its controlled permanganate oxidation yields only aliphatic carboxylic acids and oxides of carbon. See, in this connection, an article by W. E. Robinson, H. H. Heady and A. B. Hubbard in Industrial and Engineering Chemistry, 45, 788 (1953).

In addition to its ion-exchanging capacity, the sulfonated oil shale of the present invention may be utilized as a desiccant when it is embodied in the form of certain of its salts, particularly its magnesium salt, in a dry condition.

By way of further illustration, a Colorado oil shale that had a Fisher assay of about 67 gallons of oil per ton of oil shale was ground, treated with hydrochloric acid to remove carbonates, filtered, washed thoroughly with water, dried and subsequently sieved to obtain a finely divided material having an average particle size between about 100 and 200 mesh. The acid pretreatment was accomplished by mixing about 1 part by weight of the ground oil shale for about 30 minutes with about 3 parts by weight of an aqueous solution of hydrochloric acid that contained about 15 percent by weight of dissolved hydrogen chloride. The ultimate analyses of the oil shale, before and after the acid pretreatment, are given in the following tabulation wherein the numerical values are the percentages by weight of the various constituents and the oxygen content can be assumed by difference:

|  | Before Acidification | After Acidification |
| --- | --- | --- |
| Carbon | 30.55 | 37.76 |
| Hydrogen | 3.76 | 5.13 |
| Chlorine | 0.14 | 1.54 |
| Nitrogen | 0.88 | 1.30 |
| Sulfur | 2.04 | 2.39 |
| Ash | 56.31 | 49.45 |

About 20 grams of the sieved, acid treated oil shale was suspended in about 100 milliliters of methylene chloride to which was added about 6 milliliters of chlorosulfonic acid. The resulting mixture was permitted to stand at room temperature for about an hour after which it was refluxed for about an hour and subsequently maintained at room temperature for an additional sixteen hour period. It was then filtered to obtain a sulfonated oil shale residue which was sequentially washed with methylene chloride, dilute aqueous hydrochloric acid and water. The residue was then immersed in about 100 milliliters of a 5 percent by weight aqueous solution of sodium hydroxide in which it was heated at the boil for about 30 minutes. After cooling and upon subsequent filtration, washing with water and drying, about 10.4 grams of a substantially alkali-insoluble sulfonated oil shale product, essentially devoid of acid extractable inorganic carbon, was obtained. Upon analysis, it was found to contain about 6.06 percent by weight of combined sulfur.

Titration of the free acid form of the sulfonated oil shale product indicated that it had an ion-exchanging capacity of about 1.683 milliequivalents per gram. When a magnesium salt in a dry condition was prepared from the sulfonated oil shale product it was observed to accumulate moisture in the amount of about 5.61 percent of its weight upon standing in air. When about 0.1058 gram of the sodium salt of the sulfonated oil shale product was shaken with about 100 milliliters of a water sample having an initial hardness of about 96 parts per million, the hardness value was found to have been reduced by almost 75 percent to about 25 parts per million.

As is apparent, the sulfonated oil shale product of the present invention is particularly adapted for utilization as an ion-exchange material or as a desiccant having many unique advantages due to its relative inexpensiveness. As an example, valuable minerals, such as uranium, could readily be removed from solution by ion-exchange with a sulfonated oil shale product in accordance with the invention and subsequently recovered from the remaining ash that would be obtained upon burning off the organic constituents of the sulfonated material.

What is claimed is:

1. Sulfonated oil shale.
2. Sulfonated oil shale containing at least about 1 percent by weight of combined sulfur in addition to the naturally occurring combined sulfur in the oil shale.
3. Sulfonated oil shale that is substantially devoid of inorganic carbon which is further extractable upon ordinary acidification.
4. Sulfonated oil shale that is essentially composed of substantially alkali-insoluble material.
5. Sulfonated oil shale that is substantially devoid of inorganic carbon which is further extractable upon ordinary acidification, said sulfonated oil shale being essentially composed of substantially alkali-insoluble material.
6. Sulfonated oil shale according to claim 5 and containing between about 2 and 8 percent by weight of combined sulfur.
7. Sulfonated oil shale according to claim 5 derived from an oil shale having a Fisher assay of at least about 10 gallons of oil per ton of oil shale.
8. The free acid form of a sulfonated oil shale according to claim 5.
9. A metallic salt of a sulfonated oil shale according to claim 5.
10. A magnesium salt of a sulfonated oil shale according to claim 5.
11. An alkali metal salt of a sulfonated oil shale according to claim 5.
12. Finely divided sulfonated oil shale according to claim 5.
13. Method for the preparation of sulfonated oil shale which comprises treating an oil shale with a sulfonating reagent that is selected from the group consisting of oleum, chlorosulfonic acid, free sulfur trioxide and mixtures thereof.
14. Method for the preparation of sulfonated oil shale which comprises first removing the naturally occurring, acid extractable carbonate substances from an oil shale, then treating the substantially carbonate-free oil shale with a sulfonating reagent that is selected from the group consisting of oleum, chlorosulfonic acid, free sulfur trioxide and mixtures thereof.
15. In the method of claim 14, removing the naturally occurring, acid extractable carbonate substances from the oil shale by acid pretreatment thereof.
16. Pretreating with hydrochloric acid according to the method defined in claim 15.
17. Method for the preparation of sulfonated oil shale which comprises, reducing oil shale to a finely divided form, acid pretreating said oil shale to remove the naturally occurring, acid extractable carbonate substances therefrom, suspending the resulting substantially carbonate-free oil shale in an inert liquid medium, then treating the suspended, finely divided oil shale with a sulfonating reagent that is selected from the group consisting of oleum, chlorosulfonic acid, free sulfur trioxide and mixtures thereof and subsequently extracting the alkali-soluble constituents from the sulfonated oil shale.
18. Sulfonating with chlorosulfonic acid according to the method defined in claim 17.
19. Sulfonating at a temperature between about 20 and 40° C. according to the method defined in claim 17.
20. Suspending the carbonate-free oil shale in methylene chloride and sulfonating with chlorosulfonic acid at a temperature between about 20 and 40° C. according to the method defined in claim 17.

(References on following page)

References Cited in the file of this patent

UNITED STATES PATENTS

| | | |
|---|---|---|
| 1,703,838 | Fischer et al. | Feb. 26, 1929 |
| 1,775,622 | Heckel et al. | Sept. 9, 1930 |
| 2,523,582 | Mattson | Sept. 26, 1950 |
| 2,692,226 | Smith | Oct. 19, 1954 |
| 2,722,498 | Morrell et al. | Nov. 1, 1955 |

FOREIGN PATENTS

| | | |
|---|---|---|
| 166,727 | Great Britain | July 26, 1921 |

OTHER REFERENCES

Field Information Agency, Fiat Final Report No. 715 (November 1, 1946), p. 39.